United States Patent
Neuling

[19]

[11] Patent Number: 6,003,625
[45] Date of Patent: Dec. 21, 1999

[54] REAR-DRIVE, RIDE-ON TRACTOR PROPULSION UNIT FOR ARTICULATION WITH MANUALLY STEERABLE UTILITY VEHICLES

[76] Inventor: William V. Neuling, 4700 St. Johns Rd., Greenville, Ind. 47124

[21] Appl. No.: 09/146,000

[22] Filed: Jan. 13, 1998

Related U.S. Application Data

[63] Continuation-in-part of application No. 08/647,597, Mar. 13, 1996, Pat. No. 5,718,534.

[51] Int. Cl.$^6$ ........................................................ B62M 7/14
[52] U.S. Cl. .......................... 180/11; 180/14.2; 180/294; 280/32.7
[58] Field of Search .................. 180/11, 12, 13, 180/14.1, 14.2, 15, 16, 294, 298; 280/32.7

[56] References Cited

U.S. PATENT DOCUMENTS

| | | | |
|---|---|---|---|
| 2,583,272 | 1/1952 | Metzler | 180/11 |
| 2,867,449 | 1/1959 | Shawver | 180/11 |
| 2,895,279 | 7/1959 | Schrage | 180/11 |
| 4,572,310 | 2/1986 | Peter | 180/6.24 |
| 4,771,840 | 9/1988 | Keiler | |

*Primary Examiner*—Kevin Hurley
*Attorney, Agent, or Firm*—Laurence R. Brown

[57] ABSTRACT

A rear-drive, ride-on tractor propulsion unit is provided for articulation with manually steerable utility vehicles wherein a hydrostatic trans-axle transmission couples a gasoline motor to individual ones of two drive wheels about which the propulsion unit framework is pivoted. The drive wheels rotate about fixed axially aligned non-rotatable axles, and are independently driven by belts from the two axles of the transmission. In this manner, equal torque drive to the respective wheels is applied in one drive mode to maintain a preferred straight line drive path for the propulsion unit. For manual steering over a curved path the tractor unit permits a steerable three or four wheel utility vehicle to be pivoted about its rear wheels. A hydrostatic trans-axle transmission drive provides forward and reverse gears and braking. A low center of gravity provided by small wheels is made feasible by faster rotation speeds than the transaxle speeds afford. This is supplied by a gear train coupled between the two trans-axle transmission drive shafts and respective drive wheels.

11 Claims, 5 Drawing Sheets

REAR-DRIVE, RIDE-ON TRACTOR PROPULSION UNIT FOR ARTICULATION WITH MANUALLY STEERABLE UTILITY VEHICLES

This is a continuation-in-part of my application Ser. No. 08/647,597, filed Mar. 13, 1996 U.S. Pat. No. 5,718,534.

TECHNICAL FIELD

This invention relates to ride-on, push-drive, two-wheeled motorized tractor locomotion units for articulating to manually steerable utility vehicles, and more particularly it relates to improved such locomotion units for universally adapting to a range of different manually steerable utility vehicles.

BACKGROUND ART

Two-wheeled, push-drive, ride-on locomotion units for manually steerable utility vehicles are known in the art as represented by U.S. Pat. No. 4,771,840 issued to R. A. Keller on Sep. 20, 1988. This power drive unit is articulated at a ball joint to a manually steerable shopping cart, and comprises a variable speed electric motor. A riding seat is located forwardly of the motor to put a downward load on the coupling shaft, which varies with the weight of a rider, and loads down the rear wheels of the four wheeled shopping cart. An axle to which the two drive wheels are affixed is driven by the motor through an intermediate conventional differential.

This type of push-drive locomotion presents many heretofore unsolved problems in the art. For example, it is a deficiency that the tractor unit disturbs the loading of the driven utility vehicle. Also, when the rider must be extremely alert in any attempt to drive the utility vehicle in a straight line, that is a significant disadvantage. Furthermore these push-drive units make steering difficult in that wheels affixed to an axle for driving without independent rotation of the separate wheels introduces tracking problems and thus erratic steering may result that must be corrected by the driver by appropriate compensatory manipulation of the driven utility vehicle. Nor is there in this exemplary prior art provision for bi-directional drive or reverse movement.

Accordingly, this invention has the objective of providing improved push-drive locomotion units.

DISCLOSURE OF THE INVENTION

This invention therefore provides ride-on, rear-drive, motor-powered tractor drive units for articulation to manually steered and pushed walk-behind utility vehicles for thereby converting those vehicles into higher-speed, rider-steered motorized systems. A quick connect-disconnect ball-socket articulation joint provides a sharp turning radius, typically eighty degrees.

The two drive wheels are rotated separately about fixed axles, and are independently driven by transmission means capable of providing equal torque to the respective wheels. The separately driven wheels thus provide improved performance involving the tractor steering function including a preferred straight line path thus simplifying operator steering when equal torque drive is employed. A hydrostatic transmission with trans-axle drive provides braking and equal torque drive features. This transmission has each axle geared to convert motor speed upwardly to obtain high wheel rotation speeds thus producing desired transport speeds with smaller diameter wheels. These smaller diameter wheels in turn provide a low center of gravity and a lower operator seating profile. Thus much more stability is afforded when the tractor is operating in the presence of ridges or bumps in the transport path. Also the trans-axle drive mechanism permits independent control of the two drive wheels about curves thus affording much sharper turning radiuses. The the tractor accordingly becomes in part a steering mechanism both for straight line and curved transport paths when articulated to a manually steered utility vehicle.

A common axis for the two drive wheels serves as a pivot axis for the tractor framework. In this respect, balancing controls are provided positioning the tractor load including driver relative to the pivot axis. Thus the loading upon different driven vehicles may be optionally adjusted. In this respect, a telescopically mounted framework extension houses the hydrostatic transmission for back and forth movement to establish a desired distribution of weight of the tractor equipment including motor and driver about the pivot axis provided by the two drive wheels. This provides adjustment of the torque weight that loads a driven utility vehicle.

Thus, this novel tractor drive unit may be better coordinated and matched to a wider range of utility vehicles without burdening them with unmatched loading or interfering in the steering operations. In the latter respect consider that if steering depends upon pivoting a three or four wheel utility vehicle on its rear wheels to help steer around sharp curves, there should be compatible loading from the tractor unit on those rear wheels of the tractor unit. Thus, the tractor unit balance controls can substantially universally adapt to a wide variety of driven utility vehicles for optimum drive/steering compatibility. This feature also makes the improved tractor unit less sensitive to driver loading changes, whether or not the drive seat is balanced exactly over the tractor pivot axis to essentially provide custom tailoring for a driver's weight.

Other objects, features and advantages of the tractor drive unit afforded by this invention will be found throughout the following description, claims and appended drawings.

BRIEF DESCRIPTION OF THE DRAWINGS

In the accompanying drawings, wherein like reference characters are used in the respective views to designate similar features for facilitating comparison.

THE PREFERRED EMBODIMENTS

Figure 1:
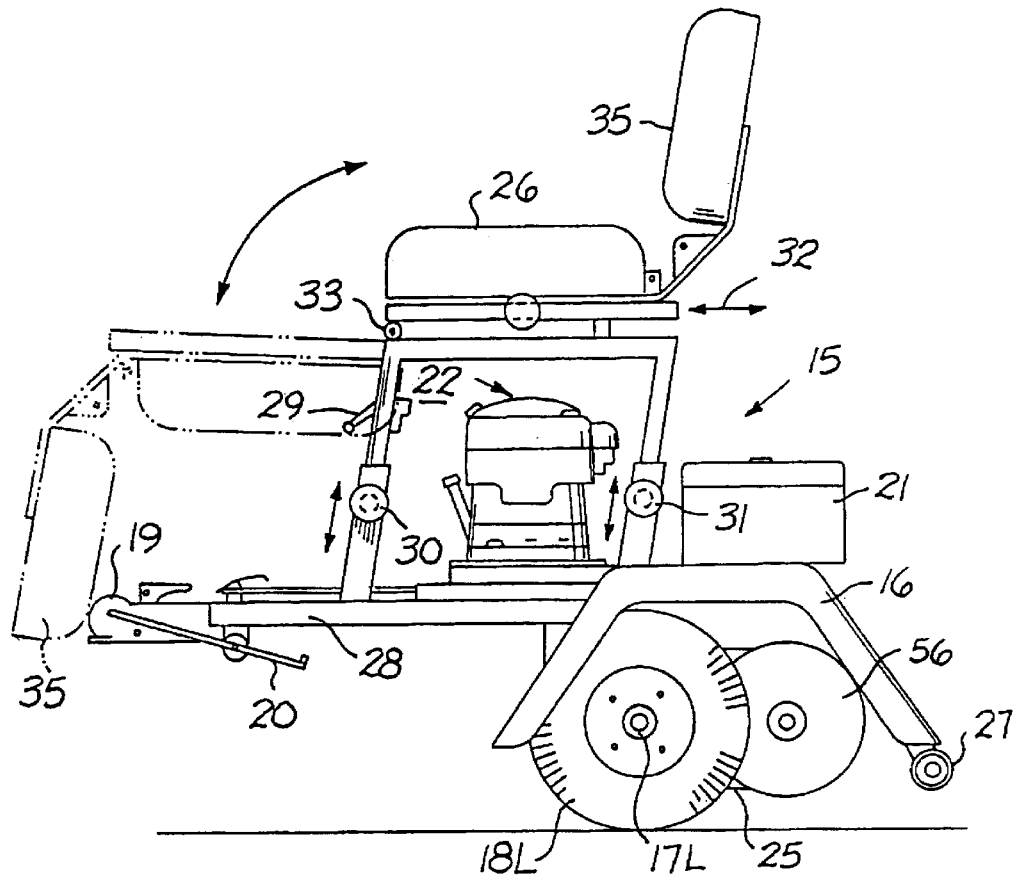
FIG. 1 is a left side view sketch of the ride-on tractor unit afforded by this invention as a rear drive unit attachable to a variety of utility vehicles.
Figure 1A:
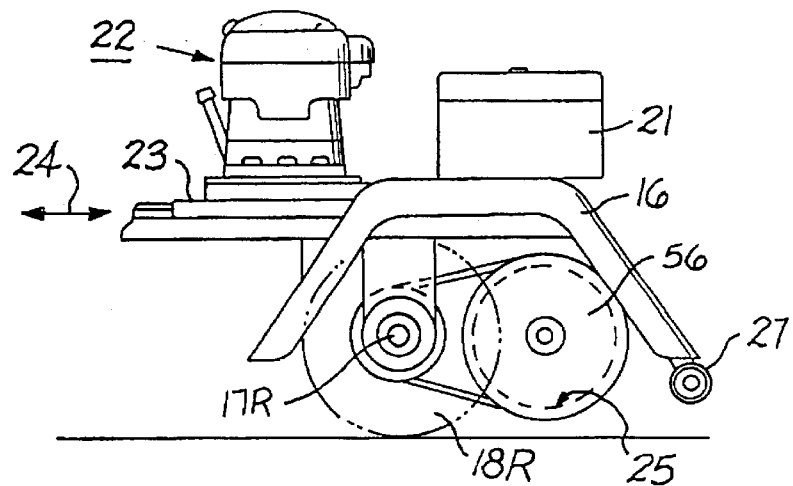
FIG. 1A is a fragmental section view of the FIG. 1 tractor unit eliminating the seat as well as the foreground wheel and accompanying drive members to better show the manner of pivotably rotating the framework and motor of the tractor unit about the common pivot axis of the two drive wheels and the function of the rear roller rest wheel for use in parking the tractor unit when disconnected from a utility vehicle.

The two wheeled tractor drive propulsion unit 15 afforded by this invention is shown in FIGS. 1 and 1A. A framework 16, extending forward toward tongue 28, is pivoted to rotate about a pivot axis defined by the two non-rotatable coaxial drive axles 17L and 17R provided independently on the opposite sides for rotation thereon of the two drive wheels 18R and 18 L. The front articulation socket joint element 19, has a quick release mechanism 20, which rests near the frontmost extremity of the tongue 28 extending toward the front from the framework 16. The socket joint element 19 is the socket joint for a mating ball-joint element, namely a ball hitch connector residing on the utility vehicle to be pushed by the tractor unit 15 in a push drive tractor mode.

Note the pivot axis 33 provides for storing the seat 26–35 in a more compact position when the tractor unit 15 is parked by resting on wheel 27. This feature permits the unit to be stored with the tongue 28 vertically oriented in small allocated spaces when desired.

Figure 2:
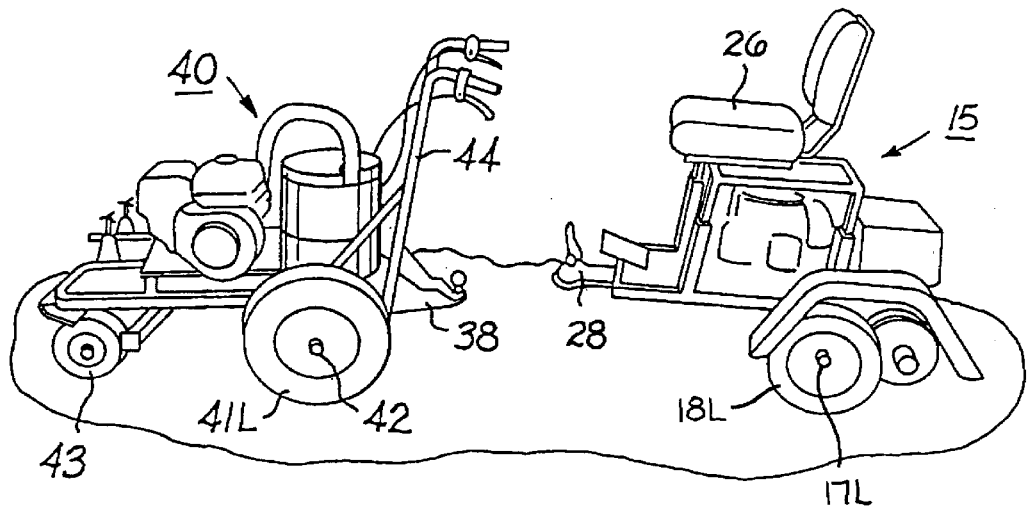
FIG. 2 is a perspective view of the tractor unit being positioned to connect at an articulation joint behind a handlebar-steered, three-wheeled manually-pushed utility vehicle by way of an intermediate ball-socket hitch.

As shown in FIG. 2, the two-drive-wheeled, rear-drive tractor unit 15 couples the socket 28 to the trailer hitch ball attachment 38 of the utility vehicle 40 to be pushed. The utility vehicle is typically a hand steered unit having handlebars 44, such as the illustrated paint striper unit 40. In this respect a low profile is desired for the tractor unit 15, with small diameter wheels for this purpose, enabling the driver sitting in seat 26 to be in visual control while comfortably reaching the handlebars used to steer and operate the utility vehicles.

Note that in the coupling of the tractor unit tongue 28 to the utility vehicle 40, the weight of the tongue on the utility vehicle 40 is critical. Thus provisions are made for adjusting the tongue loading, by balancing the tractor unit about the pivot axis defined by the drive wheels 17L and 17R. Otherwise an uncontrolled tongue load, if too heavy, tends to pivot the front end of the utility vehicle 40 upward and accordingly disturbs the steering of the pivotable front wheel 43 by reducing friction with the drive surface. Likewise, if the tongue load is too light, there is a greater burden imposed upon the driver to pivot the handlebars 44 backwardly in order to remove the front caster wheel 43 from the drive surface and make sharper turns with pivoting action using only the two rear wheels 41 of the utility vehicle 40 in contact with the drive surface. Thus, it is a feature of this invention that provisions are in the tractor unit 15 for balancing the tractor load with respect to the pivot axis defined by the two tractor drive wheels 17L and 17R to appropriately distribute the tractor's unit weight borne by the tongue 28.

Figure 3:
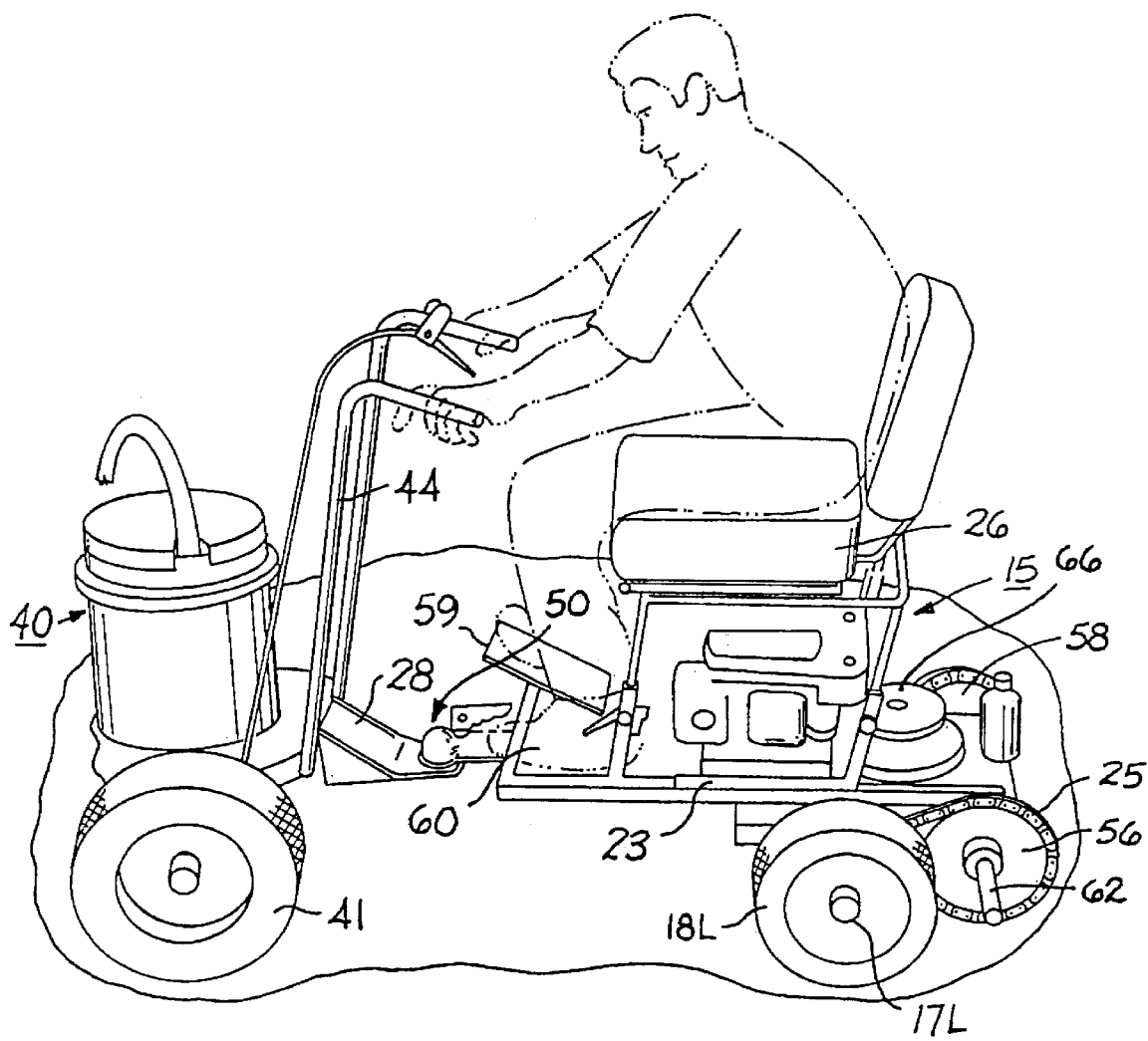
FIG. 3 is a perspective view of an embodiment of the invention showing the tractor unit coupled to a paint striping utility vehicle.

In FIG. 3, it is seen that the only connection between the rear tractor unit 15 and the front striper unit utility vehicle 40 is the pivot joint 50 that permits the two units to articulate. The ball joint permits vertical as well as lateral priority so that the handlebars 44 may pivot backwardly about the utility vehicle rear wheels 41.

Typically, a turning radius of eighty degrees is achieved by operation of the hydrostatic trans-axle transmission drive unit in cooperation with the separate drive of the individual tractor unit drive wheels 18L and 18R. Thus in effect the tractor unit 15 serves both as a passive and a dynamic steering aid for the utility vehicle 40. The articulation coupling by the conventional socket-ball joint 50, permits pivoting both in the lateral and vertical dimensions, thus facilitating the connection and cooperation of the tractor unit 15 with various types of manually steerable utility vehicles.

Figure 4:
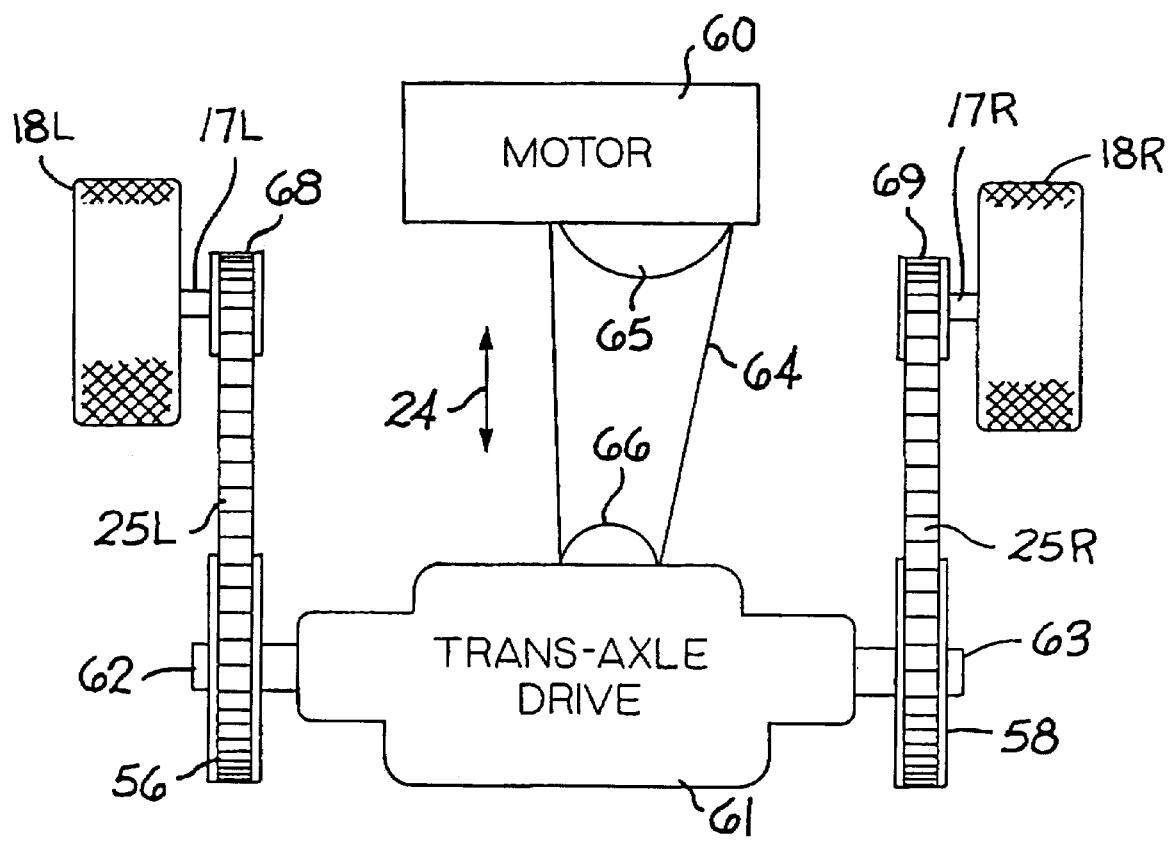
FIG. 4 is a diagrammatic sketch of the hydrostatic trans-axle transmission drive system afforded by this invention.
Figure 9:
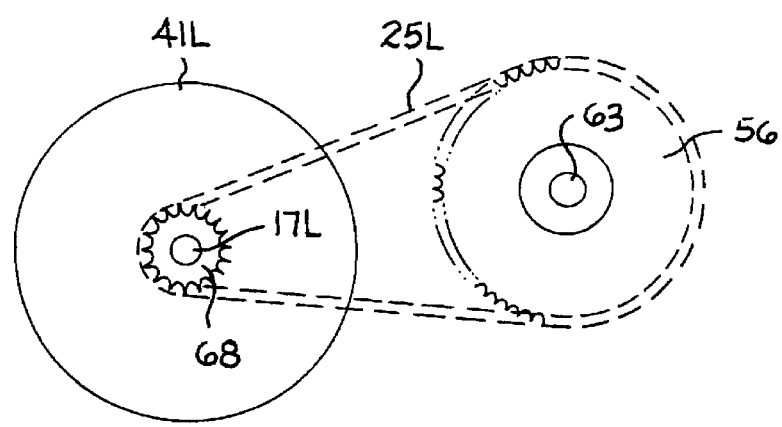
FIG. 9 is a fragmental side view sketch of the belt drive connection from the trans-axle drive unit to the drive wheel on the left side of the tractor drive unit.

As seen in FIG. 4, the left hand power drive shaft 62 from the trans-axle transmission 61, upon which the cogwheel 56 is affixed, is rotated by the trans-axle power drive rotor 66 from motor power unit 60 by way of drive belt 64 coupled to a flywheel 65 of the gasoline motor 60 positioned under the tractor unit seat 26. It is pertinent that the sprocket wheel 56 drives a pinion gear 68 (FIG. 9) with sprocket chain-belt 25L to rotate the small diameter drive wheel 18L at high rotation speeds. Similarly, as seen from FIG. 4, on the right side of the tractor unit 15, the trans-axle drive shaft 63, via sprocket wheel 58 and belt 25R drives pinion gear 69.

By the gear ratio between sprocket wheels 56, 58 and the respective pinion wheels 68, 69, the rotation speed of wheels 17R and 17L is high, permitting small diameter wheels thus keeping the preferred lower profile and center of gravity of the tractor unit 15.

The trans-axle drive unit 61 shown in FIG. 4 is available as Model K60 from John Deere & Co., for example. This unit in the drive train provides significant advantages in the steering of the two wheel drive tractor unit 15, in providing forward and reverse drives and in locking the unit as a brake in the neutral position of a control arm (27, FIG. 1) or equivalent foot pedal arrangement. A hand type emergency brake is also available on the transmission unit for separate actuation by pedal or hand lever.

The engine power, typically 5 to 8 HP, is sufficient to drive manually-steered walk-behind utility vehicles such as the paint striper unit 40 of FIGS. 2 and 3, with the driver seated in the tractor unit 15 seat 26, at about six MPH painting speed and about 15 MPH transport speed, as compared with the approximately one MPH manual push-to-paint speed of this particular utility vehicle example.

The tractor unit 15 thus can be driven forward or reverse under control of the vertically movable hand operated engine speed and kill switch lever 29 shown in FIG. 1. Thus a default central position establishes a braking position in the hydrostatic drive mechanism, and movement of the lever 29 establishes either forward and reverse at a variable speed increasing with distance away from the default braking position. The roller 27 mounted on the rear allows the front hitch bar 28 to be picked up for resting the unit on the roller 27 without damage to the drive sprockets 56.

The gasoline motor 22, better seen in FIG. 1, is mounted on a slidable chassis mechanism 23, (FIG. 3) which moves back and forth as indicated by arrow 24. Thus, tension may be adjusted on the drive belt 64 (FIG. 4), that carries motor power from motor 60 through the intermediate hydrostatic trans-axle transmission 61 to the wheels 18R, 18L on respective sides of the tractor unit 15, which in this embodiment typically carries 12 inch diameter pneumatic tires. The trans-axle shafts 62, 63 on opposite tractor unit sides each carry larger gear wheels 56, 58 connected by cogged belts 25L and 25R to smaller pinion gears 68, 69 on the respective wheel axles 41L and 41R, as better shown in the side view sketch of FIG. 9.

This arrangement increases wheel rotation speeds permitting use of smaller tires 41R, 41L, thus lowering the center of gravity, making the tractor safer on unlevel terrain. Also the smaller wheels 18R, 18L keep the driver in the seat 26 lower to counteract any tendency of the tractor unit to tilt. The seat 26 is placed over gasoline motor 22 for placement of the primary load substantially over the pivot axis (17) thus tending to balance the load without the tendency to significantly weight down tongue 28, and therefore burden driven utility vehicles that may not be designed to bear heavy added weights on the rear wheels. Typically in manually steering three or four wheel utility vehicles they are pivotable about the rear wheels to make sharper turns with the front wheels off the drive surface, and thus steering could be hindered by incompatible loading of the drive unit 15 tongue 28 on the driven utility vehicle 40.

Perhaps the most significant interaction of the hydrostatic drive transmission 61 with the tractor unit 15 of this invention is the provision of independent drive to the respective wheels 18L, 18R which can be used in steering the tractor unit 15 and coupled utility vehicle 40 in the push mode of transport. A particularly significant advantage is the provision of a utility vehicle default drive, which prefers a straight line path, because of the equal torque drive from the trans-axles 62, 63 on the respective two drive wheels 18L and 18R. Independent drive controls for the the separate wheels furthermore provides a steering mode of operation for the tractor unit about curved paths independently imparted from the default manual steering mode on the driven utility vehicle.

Figure 5:
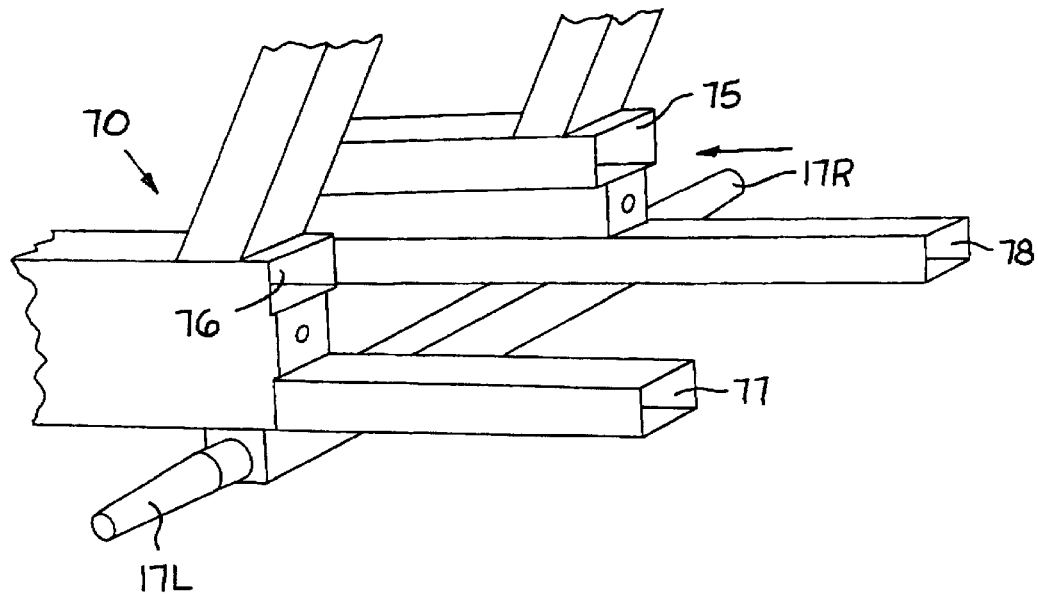
FIGS. 5 and 6, show perspective sketches of a main frame and a rearwardly mounted trans-axle mount structured to telescope for establishing a desired balance of weight about the rear drive pivot wheels of the tractor unit.
Figure 6:
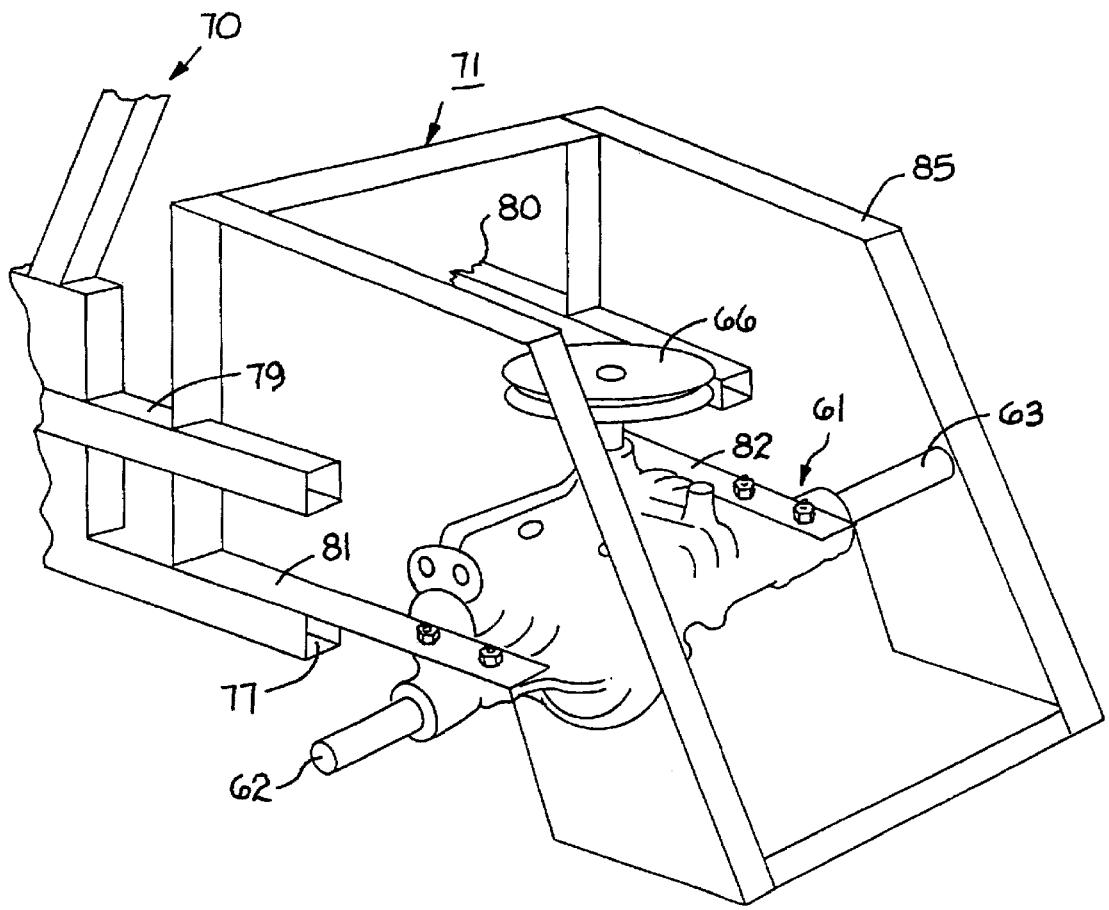
Figure 7:
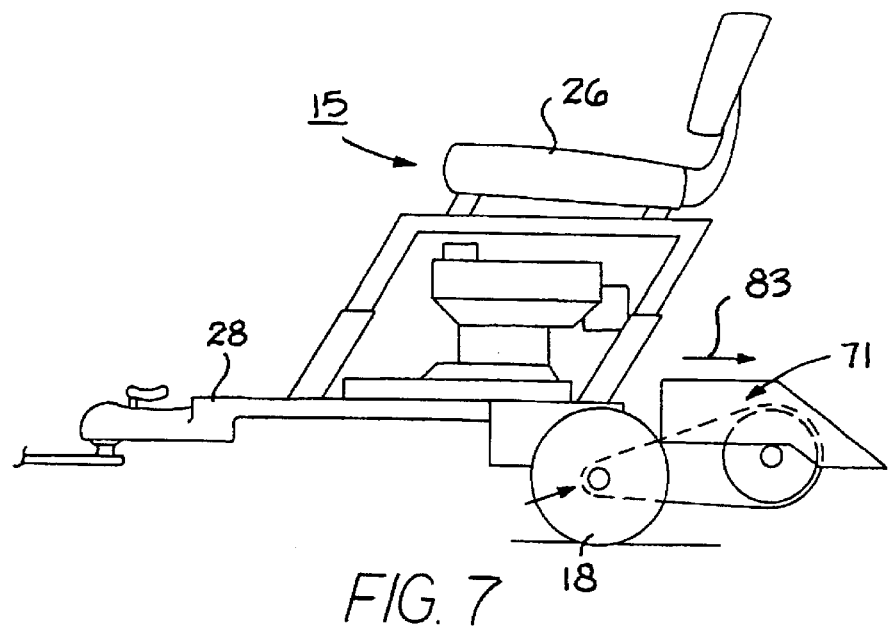
FIGS. 7 and 8, are side view sketches of a tractor drive unit with a movable trans-axle mount shown at respectively the maximum rearmost and maximum foremost telescoped positions for exerting therefore respectively lightest and heaviest tongue weights on the tractor for matching the requirements of driven utility vehicles.
Figure 8:
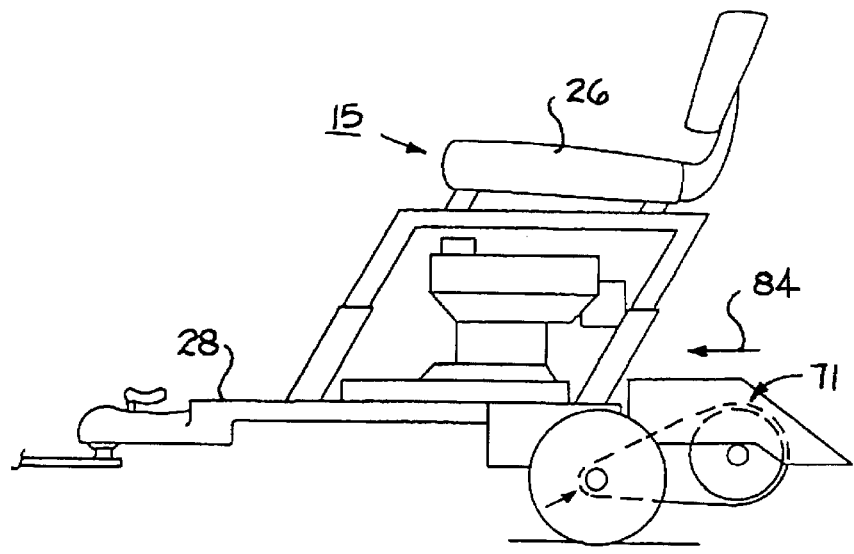

Now with reference to FIGS. 5 and 6, the trans-axle assembly 61 within cage 71 comprises a telescoping subframe 85 for inserting telescopic members 79–82 into respective main framework 70 receptacle members 75–78. Thus, as shown in FIGS. 7 and 8 the trans-axle assembly 71 can be moved telescopically toward the rear (83) to lighten the load on tongue 28. Alternatively, the trans-axle assembly 71 moves toward the front (84) to increase the load on tongue 28. This feature significantly increases the versatility of the tractor unit 15 for universal adaption to a significant range of utility vehicles, thereby permitting the loading of the tongue to be adjusted to conform with the load bearing characteristics of the utility vehicle.

It is therefore seen that this invention provides a novel ride-on, rear-push, tractor drive unit for powering a front utility vehicle unit such as a paint striper from a ball-socket type articulation joint, where the tractor unit both drives and plays a part in steering the utility vehicle unit.

Those novel features incorporating the nature and spirit of this invention are set forth with particularity in the following claims.

What is claimed is:

1. A rear-drive, ride-on tractor propulsion unit for articulation with manually steerable utility vehicles, comprising in combination:

traction means comprising of a set of two axially aligned drive wheels, a load carrying longitudinal framework extending ahead and behind and being pivotable about a pivot axis defined by the two drive wheels, said framework terminating ahead of the pivot axis in a tongue bearing an attached hitching member comprising a ball-joint articulation coupling element permitting both horizontal and vertical pivoting movement when the propulsion unit is attached to a mating ball-joint element on a utility vehicle in a push-to-drive relationship, a variable speed motor mounted on the framework, transmission means mounted on the framework coupling the motor to the two drive wheels for propulsion of the tractor unit, braking controls mounted on the framework for reducing transport speed and preventing movement of the tractor unit, a driver's seat mounted on the framework with manually accessible means mounted thereat for manual control of motor speed and manual operation of the braking controls, and balance control means comprising selectively movable positioning means for relatively distributing the weight of said motor, transmission means, braking controls and driver's seat on the framework about said pivot axis.

2. The propulsion unit of claim 1 further comprising:

wheel mounting means comprising axially aligned non-rotatable axle members affixed to said framework for rotating respective drive wheels thereabout independently.

3. The propulsion unit of claim 1, wherein the balancing control means further comprises framework members constituting telescoping means for movably positioning said transmission means in a fore-aft range of movement relative to said pivot axis.

4. The propulsion unit of claim 1, wherein the balancing control means further comprises means for moving weight bearing members of the transport unit over a fore-aft range of movement along said framework.

5. The propulsion unit of claim 1, wherein the transmission means further comprises a hydrostatic trans-axle drive transmission for providing equal torque drive independently to each drive wheel.

6. The propulsion unit of claim 1 wherein the transmission means further comprises manually controllable means for selectively propelling said unit in forward and reverse drive modes.

7. The propulsion unit of claim 6 wherein said transmission means further comprises said braking means, and the braking controls comprise a control lever movable from a central default braking position to control motor speeds in opposite directions respectively in forward and reverse gear.

8. The propulsion unit of claim 1 wherein said transmission means comprises a trans-axle drive unit and intermediate coupling gear means from respective trans-axle drive shafts for rotating the drive wheels faster than the trans-axle drive shafts.

9. The propulsion unit of claim 8 with drive wheels of small diameter, thereby providing a low center of gravity and a reduced height driver's seat for the propulsion unit.

10. A rear-drive, ride-on tractor propulsion unit for articulation to manually steerable utility vehicles, comprising in combination, traction means comprising a set of two axially aligned drive wheels rotatable on axially aligned rotatable axles, a framework mounted to pivot about the two drive wheels defining a leading tongue member, a drive mechanism comprising a gasoline engine coupled through two drive shafts of a hydrostatic trans-axle drive transmission by separate drive gearing mechanisms to each of the drive wheels, and at least one movable telescopically mounted unit positionable on the framework for selectively varying loading imposed on said tongue member.

11. A rear-drive, ride-on tractor propulsion unit for articulation to manually steerable utility vehicles, comprising in combination: traction means comprising a set of two axially aligned drive wheels rotatable on axially aligned non-rotatable axles, a drive mechanism comprising a gasoline engine coupled through two drive shafts of a hydrostatic trans-axle drive transmission by separate drive gearing mechanisms to each of the drive wheels, a framework mounted to pivot about the two drive wheels defining a leading tongue member with an articulation joint member adapted to connect the unit in a push drive relationship with a hand steered utility vehicle having a mating articulation joint member, and selectively movable load balancing means for positioning the trans-axle drive transmission over a range of fore-aft positions thereby to produce selectable loading on the tongue for transfer to a driven utility vehicle.

* * * * *